United States Patent
Watanabe

(10) Patent No.: US 9,317,735 B2
(45) Date of Patent: Apr. 19, 2016

(54) INFORMATION PROCESSING APPARATUS, INFORMATION PROCESSING METHOD, AND PROGRAM TO CALCULATE POSITION AND POSTURE OF AN OBJECT HAVING A THREE-DIMENSIONAL SHAPE

(75) Inventor: Daisuke Watanabe, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 280 days.

(21) Appl. No.: 13/993,496

(22) PCT Filed: Dec. 9, 2011

(86) PCT No.: PCT/JP2011/079122
§ 371 (c)(1),
(2), (4) Date: Jun. 12, 2013

(87) PCT Pub. No.: WO2012/081687
PCT Pub. Date: Jun. 21, 2012

(65) Prior Publication Data
US 2013/0272578 A1    Oct. 17, 2013

(30) Foreign Application Priority Data

Dec. 15, 2010   (JP) ................................. 2010-279516

(51) Int. Cl.
*G06K 9/00* (2006.01)
*G06T 7/00* (2006.01)

(52) U.S. Cl.
CPC .......... *G06K 9/00201* (2013.01); *G06T 7/0046* (2013.01); *G06T 2207/10028* (2013.01)

(58) Field of Classification Search
None
See application file for complete search history.

(56) References Cited

U.S. PATENT DOCUMENTS 7,257,237 B1 *  8/2007  Luck et al. .................... 382/103
7,317,836 B2 *  1/2008  Fujimura et al. ............. 382/203

(Continued)

FOREIGN PATENT DOCUMENTS

EP          2383699 A2 *  4/2011

OTHER PUBLICATIONS

Shunichi Kaneko, et al., "Robust ICP Registration Algorithm Extended by M-Estimation," Technical report of IEICE. PRMU 100(507) pp. 21-26.
Robert L Larkins et al. "Analysis of ICP Variants for the Registration of Partially overlapping time-of-flight range images," School of Engineering, Unversity of Waikato, New Zealand, pp. 1-8. Nov. 2010, http://dx.doi.org/10.1109/IVCNZ.2010.6148869.

(Continued)

*Primary Examiner* — Tahmina Ansari
(74) *Attorney, Agent, or Firm* — Canon USA, Inc. IP Division

(57) ABSTRACT

An information processing apparatus includes a first setting unit setting a relative position-posture relationship between a 3D-shaped model of an object and a viewpoint from which the model is observed as a base position-posture, a detector detecting geometric features of the model observed from the viewpoint in the base position-posture as base geometric features, a second setting unit setting a relative position-posture relationship between the model and a viewpoint as a reference position-posture, a retrieval unit retrieving reference geometric features corresponding to the base geometric features of the model observed from the viewpoint in the reference position-posture, a first calculation unit calculating similarity degrees between the base geometric features and the reference geometric features, and a second calculation unit calculating evaluation values of correspondences between the base geometric features and the reference geometric features in accordance with the similarity degrees.

11 Claims, 7 Drawing Sheets

(56) References Cited

U.S. PATENT DOCUMENTS

| | | | |
|---|---|---|---|
| 8,023,727 B2 * | 9/2011 | Matsumoto et al. | 382/154 |
| 8,351,646 B2 * | 1/2013 | Fujimura et al. | 382/103 |
| 8,363,928 B1 * | 1/2013 | Sharp | H04N 7/18 348/143 |
| 8,379,014 B2 * | 2/2013 | Wiedemann et al. | 345/419 |
| 8,620,050 B2 * | 12/2013 | Liao et al. | 382/130 |
| 2008/0152191 A1 * | 6/2008 | Fujimura et al. | 382/103 |
| 2009/0226113 A1 * | 9/2009 | Matsumoto et al. | 382/284 |
| 2009/0244309 A1 * | 10/2009 | Maison et al. | 348/222.1 |
| 2011/0235897 A1 * | 9/2011 | Watanabe et al. | 382/154 |
| 2011/0267344 A1 * | 11/2011 | Germann et al. | 345/420 |
| 2013/0016877 A1 * | 1/2013 | Feris et al. | 382/103 |
| 2013/0272578 A1 * | 10/2013 | Watanabe | 382/103 |

OTHER PUBLICATIONS

Minh-Duc Tran et al. "Improved ICP Control Algorithm in Robot Surgery Application," IEEE 2010, pp. 1-4.

Xiao G et al. "Registration of partially overlapping surfaces by rejection of false point correspondences," Pattern Recognition 29, 2006, pp. 373-383.

Steder B et al. "Robust On-line Model-based Object Detection from Range Images," the 2009 IEEE/RSJ International Conference on Intelligent Robots and Systems, Oct. 11-15, 2009, St. Louis, USA, pp. 4739-4744.

Alberto Guarnieri et al. "Automatic registration of large range datasets with spin-images," Journal of Cultural Heritage 12, 2011, pp. 476-484.

* cited by examiner

INFORMATION PROCESSING APPARATUS, INFORMATION PROCESSING METHOD, AND PROGRAM TO CALCULATE POSITION AND POSTURE OF AN OBJECT HAVING A THREE-DIMENSIONAL SHAPE

TECHNICAL FIELD

The present invention relates to a technique of calculating a position and a posture of a certain object having a given 3D shape.

BACKGROUND ART

In recent years, as a robot technology is developed, robots are executing complicated tasks which have been performed thus far by humans. Examples of the complicated tasks include assembly of industrial products. To autonomously execute an assembling operation, a robot grasps a component using an end effector such as a hand. To grasp a component using a robot hand, a relative position and a relative posture between the component to be grasped and the robot are to be measured. Such measurement of a position and a posture is required to be performed in various cases, in addition to assembly of industrial products performed by a robot, such as estimation of a position and a posture for self position identification and re-configuration of a 3D space performed by an autonomous mobile robot.

Examples of a method for measuring a position and a posture include a method using model fitting. In the model fitting, 3D-shaped models of an object are assigned to geometric features detected from monochrome images or color images captured by a camera and assigned to distance images obtained by individually measuring the images using a distance sensor. The monochrome images and the color images described above are collectively referred to as 2D images hereinafter. In model fitting performed on a 2D image, geometric features of a 3D-shaped model are projected on the image so as to obtain correspondences with geometric features detected in the image. Then, a position and a posture are repeatedly corrected so that distances in the individual correspondences are minimized. In this way, the relationship between a position and a posture of the camera and a position and a posture of the object is calculated. In model fitting performed on a distance image, measurement points in the distance image are converted into 3D points having 3D coordinates, and correspondences between the 3D points obtained by the conversion and 3D points on a 3D-shaped model are obtained.

Then, a position and a posture are repeatedly corrected so that distances in the individual correspondences are minimized. In this way, a position-and-posture relationship between a camera and an object is calculated.

In a measurement method utilizing the model fitting, it is important to accurately obtain correspondences between geometric features of a 3D-shaped model and geometric features of a captured image. In the method described above, approximate values of a position and a posture are input as initial values of the position and the posture, and the correspondences between the geometric features of the 3D-shaped model and the geometric features of the captured image are obtained in accordance with the approximate values of the position and the posture. In this method, when the approximate values of the position and the posture are shifted from true values of the position and the posture, generation of failure correspondences is not avoidable. When a number of failure correspondences are generated, a process of estimating the position and the posture fails and accuracy of estimation of the position and the posture is deteriorated.

To address this problem, a method for reducing influence of failure correspondences by using M estimation for correspondences between geometric features of a 3D-shaped model and geometric features of a captured image has been discussed (refer to NPL 1, for example).

In this method, when a distance of a correspondence is near an average value, a large weight is applied whereas when a distance of a correspondence is far from the average value, a small weight is applied. In this way, it is estimated that a correspondence point far from the average value has a low correspondence reliability so that influence on calculation of a position and a posture is minimized.

However, in the method disclosed in Non-Patent Literature 1, degrees of contributions of the individual correspondences to a result of a process of calculating the position and the posture are controlled in accordance with the distances between the geometric features of the 3D-shaped model and the geometric features of the captured image in the correspondences. Specifically, the smaller a distance in a correspondence is, the larger a degree of a contribution sets. However, this method is merely used for excepting outliers in numerical calculation, and the determination is not performed on the individual correspondences taking geometric similarities based on an object shape such as positions of the geometric features of the 3D-shaped model and the geometric features of the captured image in the object and shapes of the geometric features of the 3D-shaped model and the geometric features of the captured image into consideration. Therefore, when a failure correspondence is generated but a distance between a geometric feature of the 3D-shaped model and a geometric feature of the captured image in the correspondence incidentally becomes small due to the shift of approximate values of the position and the posture from true values of the position and the posture, it is difficult to remove adverse effect caused by the failure correspondence using the M-estimation.

CITATION LIST

Non Patent Literature

NPL 1 "Robust ICP Registration Algorithm Extended by M-Estimation", Yuki KONDO, Atsushi MIYAMOTO, Shunichi KANEKO, Satoru IGARASHI, Technical report of IEICE. PRMU 100(507) pp. 21-26 20001207

SUMMARY OF INVENTION

The present invention has been made in consideration of the above situation, and has as its object to obtain appropriate correspondences between geometric features of a 3D-shaped model and geometric features of a captured image and perform robust calculation to obtain a position and posture of an object.

According to the present invention, the foregoing object is attained by providing an information processing apparatus including a first setting unit configured to set a relative position-and-posture relationship between a three-dimensional-shaped model of an object and a viewpoint from which the three-dimensional-shaped model is observed as a base position-posture, a detector configured to detect geometric features of the three-dimensional-shaped model observed from the viewpoint in the base position-posture as base geometric features, a second setting unit configured to set a relative position-and-posture relationship between the three-dimensional-shaped model of the object and a viewpoint from which the three-dimensional-shaped model is observed as a reference position-posture which is different from the base position-posture, a retrieval unit configured to retrieve reference geometric features corresponding to the base geometric features of the three-dimensional-shaped model observed from the viewpoint in the reference position-posture, a first calculation unit configured to calculate degrees of similarity between the base geometric features and the reference geometric features, and a second calculation unit configured to calculate evaluation values of correspondences between the base geometric features and the reference geometric features in accordance with the degrees of similarity calculated by the first calculation unit.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

Figure 1:
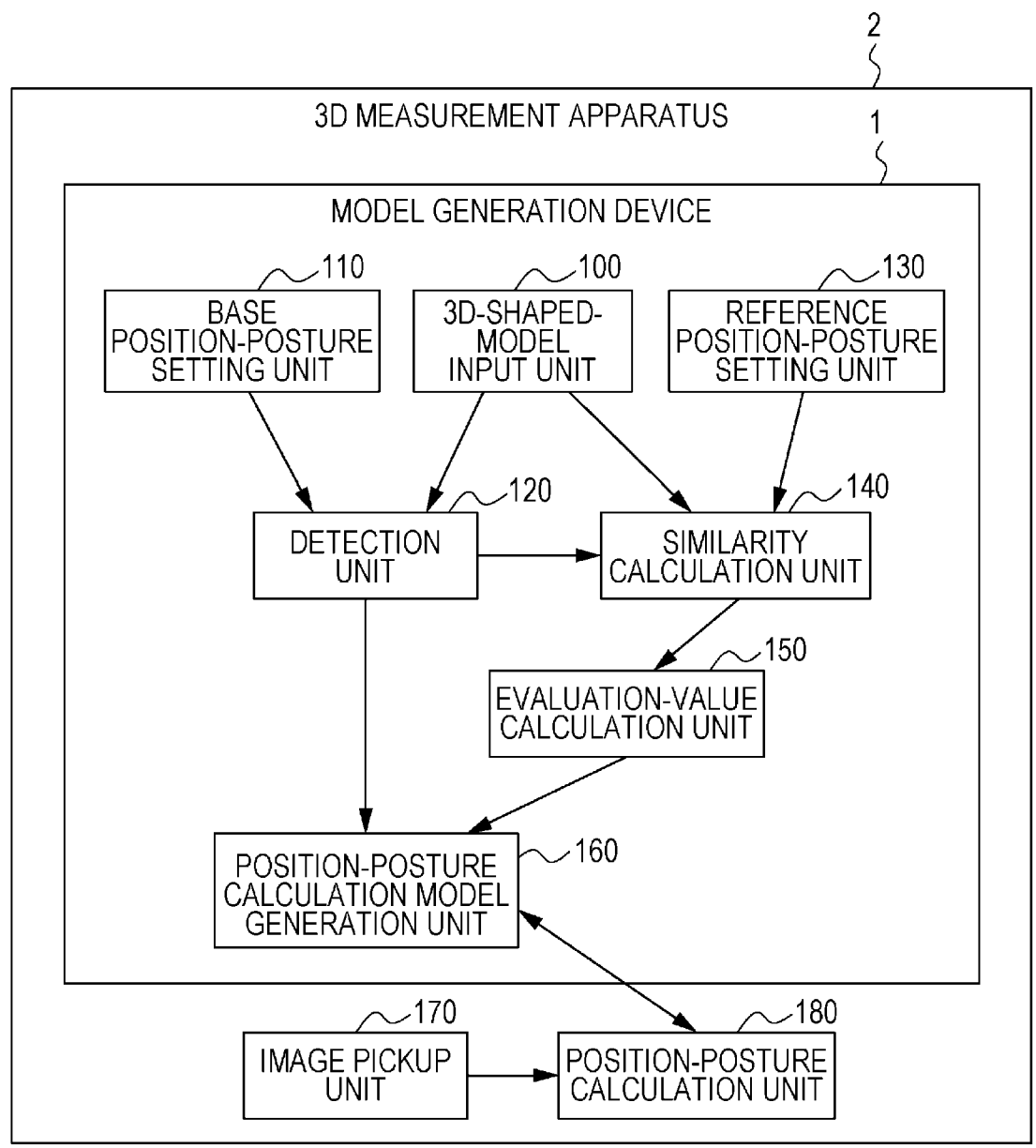
FIG. 1 is a diagram illustrating a configuration of a model generation device which performs off-line model generation and a configuration of a 3D measurement apparatus which performs on-line position-and-posture calculation.

Preferred embodiments of the present invention will be described in detail in accordance with the accompanying drawings.

A first embodiment of the present invention will now be described. In the following description, first, an off-line model generation process performed as a preparation step of a position-and-posture estimation process will be described. Thereafter, an on-line process of estimating a position and a posture (hereinafter referred to as a "position-posture") of an object using a position-posture calculation model which is generated through the model generation process and which will be described hereinafter will be described.

Note that a term "a position-posture of an object" described in the following description means a position-posture of an object relative to a camera which captures an image of the object.

In the model generation process, evaluation values representing rates of correspondences of geometric features of a 3D-shaped model (hereinafter referred to as "model geometric features") which are successfully performed are calculated in advance, and the model geometric features and the evaluation values are used in combination to generate a position-posture calculation model. Furthermore, in the position-posture estimation process, a position-posture of the object is calculated by selecting some of the model geometric features to be used for the position-posture estimation in accordance with the evaluation values corresponding to the model geometric features.

In the position-posture estimation method according to this embodiment, correspondences between 3D points in the position-posture calculation model and 3D points in a distance image are obtained in accordance with an approximate position-and-posture (hereinafter referred to as an "approximate position-posture") given as an initial value. Then, a position-posture of the object is calculated by repeatedly correcting the position-posture so that a sum of distances in the correspondences is minimized. In this case, when the approximate position-posture is shifted from a true value of the position-posture, failures occur in the correspondences of the 3D points. Accordingly, in this embodiment, a number of cases of shifts of the approximate position-posture are simulated so that correspondences between the 3D points in the position-posture calculation model and the 3D points in the distance image are simulated.

Thereafter, rates of the number of appropriate correspondences to the number of all trials of the simulation are calculated so that evaluation values of the 3D points in the position-posture calculation model are calculated. When the position-posture is estimated, in the position-posture calculation model, 3D points (model geometric features) having low evaluation values are eliminated and only 3D points (model geometric features) having high evaluation values are selected for calculation of the position-posture of the object. By this, robust estimation of the position-posture of the object can be performed.

Note that when a viewpoint of the camera which captures the image is changed, the 3D points observed in the image are also changed. Furthermore, the rates of appropriate correspondences of the 3D points are also changed.

Accordingly, in this embodiment, a plurality of representative viewpoints of the camera are set and groups of combinations of model geometric features and evaluation values are generated for individual viewpoints. Note that the groups of combinations of model geometric features and evaluation values for individual viewpoints are referred to as "each-viewpoint position-posture calculation models". Furthermore, a number of each-viewpoint position-posture calculation models which correspond to the number of viewpoints are collectively stored as a "position-posture calculation model".

FIG. 1 is a diagram illustrating a configuration of a model generation device 1 which performs off-line model generation and a configuration of a 3D measurement apparatus 2 which performs on-line position-posture calculation according to this embodiment.

As shown in FIG. 1, the model generation device 1 includes a 3D-shaped-model input unit 100, a base position-posture setting unit 110, a detection unit 120, a reference-position-posture setting unit 130, a similarity calculation unit 140, an evaluation-value calculation unit 150, and a position-posture-calculation model generation unit 160. Furthermore, the 3D measurement apparatus 2 includes the model generation device 1, an image pickup unit 170 and a position-posture calculation unit 180. The configuration shown in FIG. 1 corresponds to an application example of an image processing apparatus according to the present invention.

Figure 2:
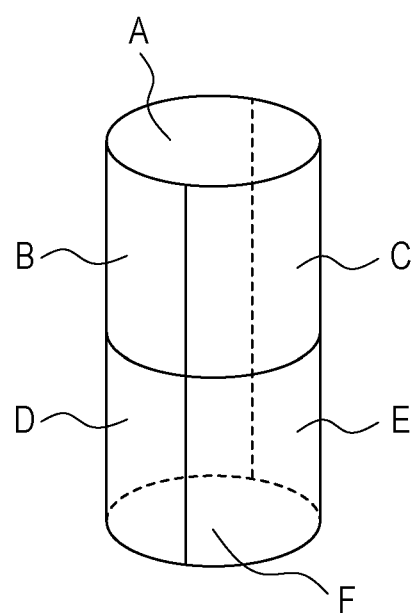
FIG. 2 is a diagram illustrating an example of a 3D-shaped model.

The 3D-shaped-model input unit 100 inputs a 3D-shaped model representing a shape of an object. FIG. 2 is a diagram illustrating an example of the 3D-shaped model. As shown in FIG. 2, the 3D-shaped model is configured by a combination of a plurality of surface patches. Each of the surface patches is defined by a surface and a parameter representing a contour of the surface. In the example of FIG. 2, the 3D-shaped model includes six patches, i.e., circle surface patches A and F and half-cylinder surface patches B to E. Note that the 3D-shaped model is not limited to this. For example, a polygon model including triangle polygons representing individual patches may be used as the 3D-shaped model. Furthermore, any model may be used as long as a shape of an object is represented by a plurality of surface patches.

The base position-posture setting unit 110 inputs, as a base position-posture, the relative position-posture relationship between the 3D-shaped model and a virtual camera used to observe the 3D-shaped model. The base position-posture corresponds to a true value of a position-posture obtained when the object is actually captured by the camera. Note that the base position-posture setting unit 110 corresponds to an application example of a first setting unit.

The detection unit 120 detects geometric features (model geometric features) observed in the 3D-shaped model in base position-posture. In this embodiment, a process of capturing an image of the 3D-shaped model in the base position-posture is simulated so that a pseudo distance image is generated, and 3D points obtained in accordance with coordinates and depth values of pixels in the distance image are detected as model geometric features. Here, the detected model geometric features are referred to as "base geometric features" hereinafter.

The reference-position-posture setting unit 130 sets a plurality of position-postures, as reference position-postures, by shifting the base position-posture set by the base position-posture setting unit 110. The reference position-postures correspond to approximate position-postures obtained at a time of position-posture estimation. Degrees of shifts of the position-posture are preferably determined in accordance with an error range of approximate position-postures input when on-line model fitting is performed. If an error range of approximate position-postures relative to a true value of a position-posture is estimated in advance, shifts having degrees within the range are randomly performed. Alternatively, if a tendency of directions or degrees of the shifts of the approximate position-posture relative to the true value of the position-posture is given in advance, the shifts may be performed with a similar tendency. Furthermore, any method may be employed as long as shifts similar to those applied to the approximate position-postures estimated in the position-posture estimation can be applied. Moreover, a single reference position-posture may be set instead of the plurality of reference position-postures. For example, if a direction of a shift of the position-posture is limited to a fixed direction, a position-posture shifted in the direction may be input as a representative. Note that the reference position-posture setting unit 130 corresponds to an application example of a second setting unit.

The similarity calculation unit 140 retrieves correspondence points (reference geometric features) of the reference position postures in the 3D-shaped model relative to the base geometric features detected by the detection unit 120 and calculates degrees of similarity in the correspondence points. A general method may be used for a method for retrieving the correspondence points relative to the base geometric features.

Specifically, unique IDs and colors are assigned to the surface patches included in the 3D-shaped model and the 3D-shaped model is rendered on observation image planes corresponding to the reference position features. On the observation image planes, points in the 3D-shaped model which are rendered on pixels in which the base geometric features are detected are determined as the correspondence points corresponding to the base geometric features.

Calculation of the degrees of similarity is performed by determining whether the surface patches to which the base geometric features belong in the 3D-shaped model are the same as the surface patches to which the correspondence points belong in the observation image planes of the reference position-postures. The calculation of the degrees of similarity is performed for each base geometric feature. Note that the similarity calculation unit 140 corresponds to an application example of a first calculation unit.

The evaluation-value calculation unit 150 calculates evaluation values representing rates of success of correspondences of the individual base geometric features in accordance with the degrees of similarity calculated by the similarity calculation unit 140. Each of the evaluation values is calculated as a rate of a number of reference position-postures in which similar correspondences are obtained to the set reference position-postures. Note that the evaluation-value calculation unit 150 corresponds to an application example of a second calculation unit.

The position-posture-calculation model generation unit 160 makes combinations of the base geometric features and the respective evaluation values calculated by the evaluation-value calculation unit 150 and records the corresponding base position-posture along with the combinations so that an each-viewpoint position-posture calculation model is generated, which will be described hereinafter. Then, the position-posture-calculation model generation unit 160 puts together each-viewpoint position-posture calculation models of all base position-postures to generate a position-posture calculation model.

The image pickup unit 170 serves as a distance sensor which generates a distance image. The distance image includes pixels having depth information. Examples of the distance sensor include an active distance sensor which captures laser light irradiated on an object or reflection light of slit light by a camera and measures a distance by triangulation. However, the distance sensor is not limited to this and a time-of-flight distance sensor which utilizing a flight time of light may be used.

Alternatively, a passive distance sensor which calculates depths of pixels in an image captured by a stereo camera by triangulation may be used. Furthermore, any distance sensor does not detract from the principle of the present invention as long as the distance sensor obtains a distance image.

The position-posture calculation unit 180 calculates a position-posture of the object using the position-posture calculation model generated by the position-posture-calculation model generation unit 160. Specifically, the position-posture calculation unit 180 measures the position-posture of the object by assigning 3D points of the position-posture calculation model to 3D points of the distance image input by the image pickup unit 170. Note that the position-posture calculation unit 180 corresponds to an application example of a third calculation unit.

Figure 3A:
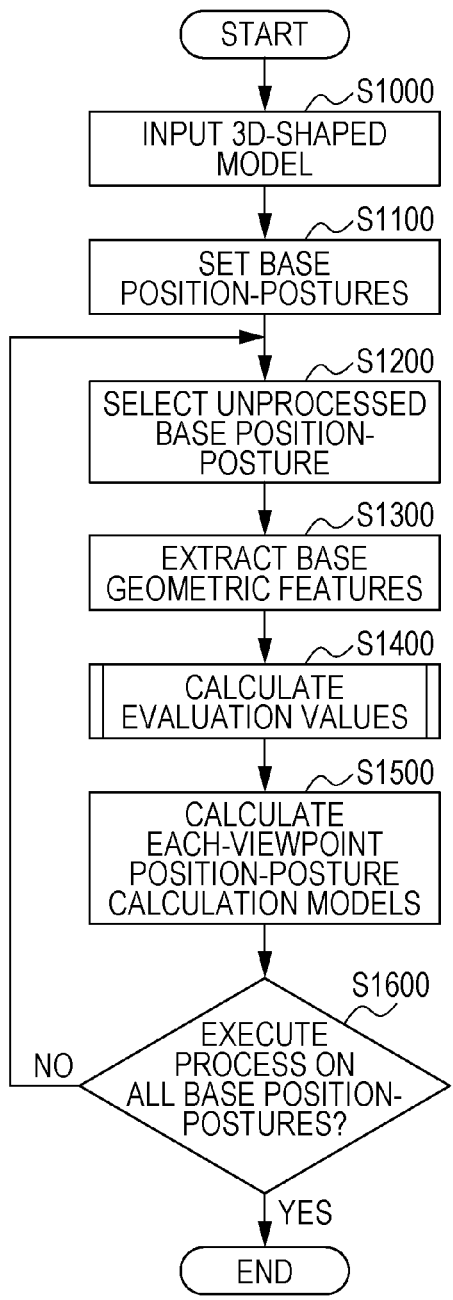
FIGS. 3A and 3B are flowcharts illustrating a procedure of a model generation process.
Figure 3B:
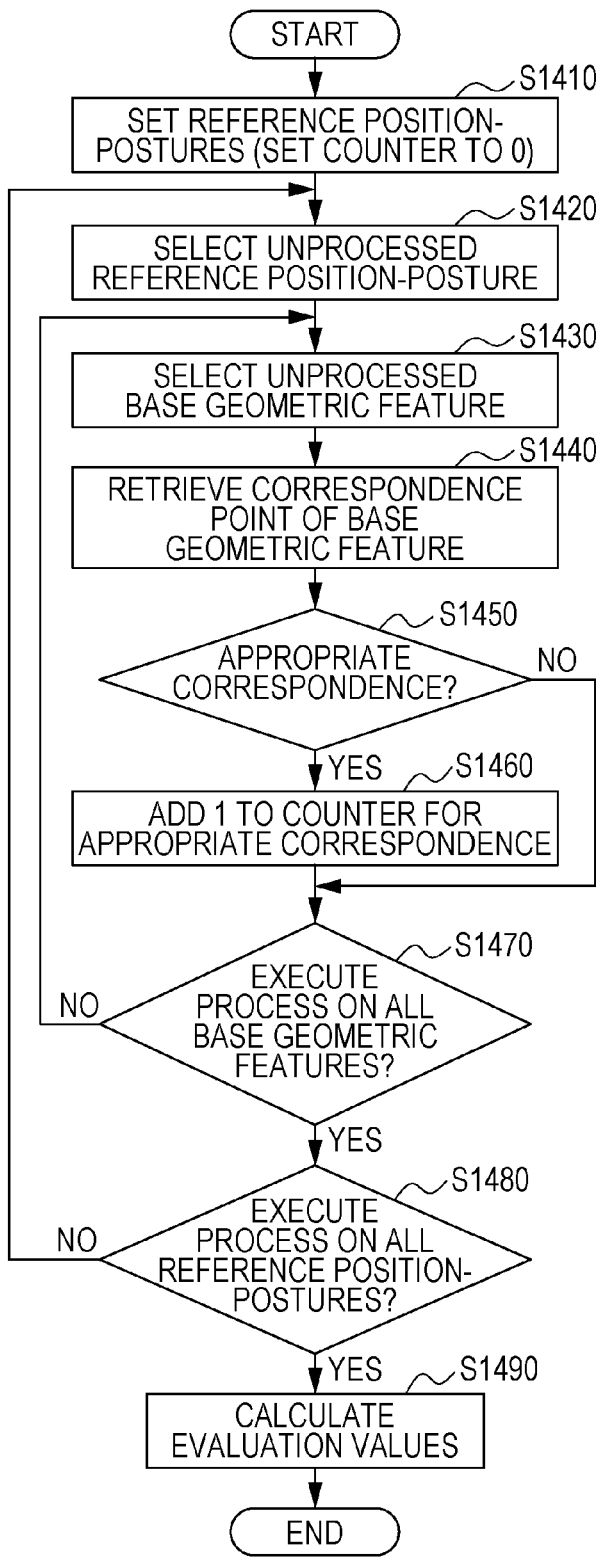

FIGS. 3A and 3B are flowcharts illustrating a procedure of the model generation process according to the first embodiment.

Operations in the model generation process will be described hereinafter with reference to FIGS. 3A and 3B. Note that FIG. 3A illustrates an entire procedure of the model generation process and FIG. 3B illustrates a detailed operation in step S1400 shown in FIG. 3A.

In step S1000, the 3D-shaped-model input unit 100 inputs a 3D-shaped model. In step S1100, the base position-posture setting unit 110 sets a plurality of base position-postures of the virtual camera which observes the 3D-shaped model. As described before, the plurality of base position-postures are set since, when a viewpoint of the camera used to capture the object is changed, rates of appropriate correspondences between geometric features in a captured image and geometric features on the 3D-shaped model are also changed.

Figure 5:
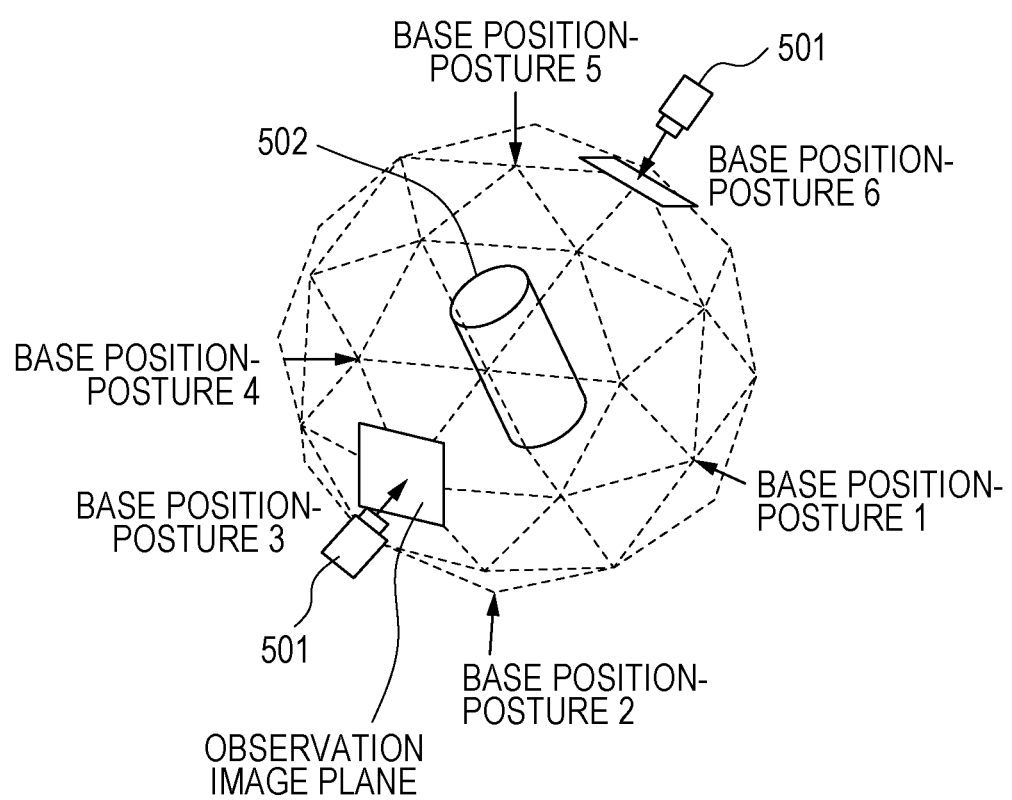
FIG. 5 is a diagram illustrating base position-and-postures.

To set the plurality of base position-postures, a geodesic dome which encloses the object is used, for example, as shown in FIG. 5. Specifically, the base position-postures are set such that vertices of the geodesic dome are determined as positions of a virtual camera 501 and directions from the vertices to a 3D-shaped model 502 are determined as viewpoints of the virtual camera 501. In this case, an arbitrary value may be set to a rolling direction of the virtual camera 501. Note that a radius of a ball which is approximated by the geodesic dome is equal to a distance between the virtual camera 501 and the 3D-shaped model 502. Accordingly, when an image pickup distance of an image used for the position-posture estimation is estimated in advance, the distance is preferably equal to the radius of the geodesic dome. Alternatively, geodesic domes having different sizes in a stepwise fashion may be provided and vertices of the geodesic domes may be set as base poison-postures. Note that the method for setting the base position-postures is not limited to these. For example, latitudes and longitudes may be assigned to the ball which encloses the object and viewpoints may be set at a regular interval in a latitude direction and a longitude direction. Alternatively, a base position-posture which is highly likely to be generated as an initial value in the position-posture estimation may be set so as to have a high density. Furthermore, any method may be employed as long as the relative position-posture relationship between the camera and the object can be simulated in the actual position-posture estimation.

In step S1200, the base position-posture setting unit 110 selects an unprocessed base position-posture from among the base position-postures set in step S1100 and sets the unprocessed base position-posture. In step S1300, the detection unit 120 detects model geometric features of the 3D-shaped model observed in the base position-posture set in step S1200 as base geometric features. Specifically, the detection unit 120 obtains a distance image of the 3D-shaped model observed in the base position-posture set in step S1200. More specifically, the detection unit 120 renders the 3D-shaped model on the observation image plane of the virtual camera which is positioned in the base position-posture and calculates distance values of pixels using data stored in a depth buffer so as to obtain the distance image. A camera parameter used when the rendering is performed on the observation image plane is preferably obtained from a camera to be actually used in the position-posture calculation.

Note that it is not necessarily the case that the distance image is obtained by calculating all the pixels on a captured image plane. For example, some pixels are sampled at a regular interval, i.e., every ten pixels, in vertical and horizontal directions on the captured image and distance values of the pixels are calculated. In this case, different colors serving as IDs are assigned to the surface patches which form the 3D-shaped model and the surface patches are rendered so that the surface patches are distinguished from one another by the assigned ID colors.

Subsequently, the detection unit 120 multiplies the obtained distance values of the pixels by respective components of sight-line vectors corresponding to positions of the pixels so as to obtain data of 3D points having 3D coordinates in a base coordinate system. The 3D points in which the 3D coordinates are calculated through this process are determined as base geometric features. In this case, IDs of surface patches including the base geometric features are recorded.

Figure 6A:
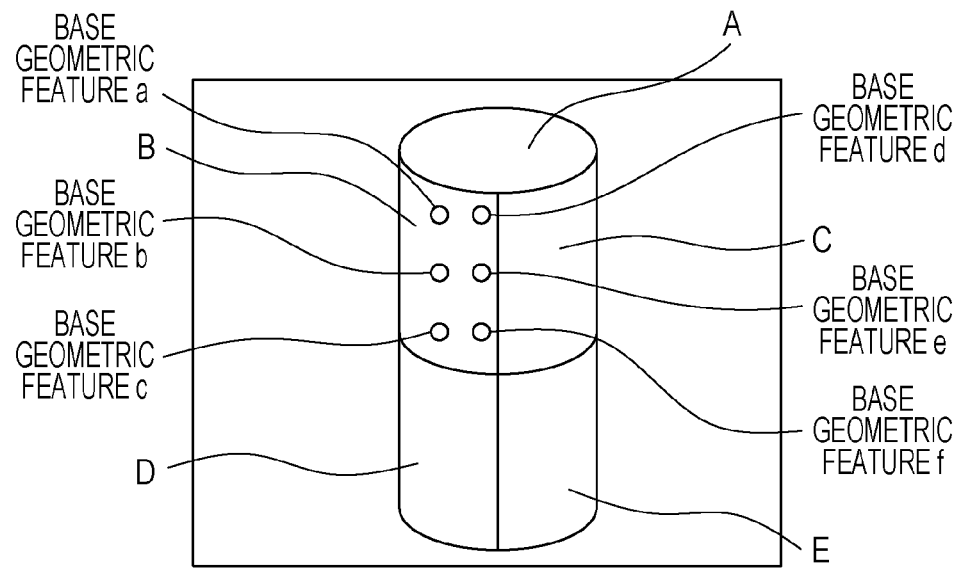
FIGS. 6A and 6B are diagrams illustrating states in which a 3D-shaped model is projected on an observation image plane of a virtual camera disposed in the base position-and-posture and in a reference position-and-posture.

FIG. 6A is a diagram illustrating a state in which the 3D-shaped model is projected on the observation image plane of the virtual camera positioned in the base position-posture. In the example shown in FIG. 6A, for example, the ID representing the surface patch B is recorded in base geometric features a to f. Note that the method for obtaining the base geometric features is not limited to this. For example, a number of 3D points on the surface patches of the 3D-shaped model may be sampled in advance to be used. In this method, the sampled 3D points are projected on the observation image plane in accordance with an observation position posture, and among the 3D points projected on pixels, 3D points which are positioned on the nearest side of a viewpoint are used. In this case, in the 3D points, IDs of surface patches corresponding to the 3D points are recorded with reference to the IDs assigned to the surface patches which form the 3D-shaped model. Note that any method may be employed as long as the 3D points observed from the base position-posture can be extracted from the 3D-shaped model.

In step S1400, evaluation values corresponding to the base geometric features detected in step S1300 are calculated. This step includes step S1410 to step S1490 shown in FIG. 3B. Hereinafter, the operation in step S1400 will be described in detail with reference to FIG. 3B.

In step S1410, the reference-position-posture setting unit 130 sets a plurality of position-postures, as reference position-postures, obtained by shifting the base position-posture. The reference position-postures correspond to approximate position-postures assigned as initial values at the time of the position-posture estimation. Assuming that the number of set reference position-postures is denoted by "N", the model generation device 1 attempts to perform a correspondence-obtaining operation N times on each of the base geometric features. Here, the model generation device 1 sets the number of base geometric features detected in step S1300 to M, and a value of a counter which counts the number of times appropriate correspondences (i=1 to M) are obtained in each of the base geometric features to Ci. All values C1 to CM are set to 0.

In step S1420, the reference-position-posture setting unit 130 selects an unprocessed reference position-posture from among the reference position-postures set in step S1410 and sets the unprocessed reference position-posture. In step S1430, the detection unit 120 selects an unprocessed base geometric feature from among the base geometric features detected in step S1300. It is assumed that an identification number of the selected base geometric feature is i.

In step S1440, the similarity calculation unit 140 retrieves a pixel (corresponding point) corresponding to the base geometric feature i selected in step S1430 from an observation image plane of the reference position-posture. In retrieval of correspondence points in on-line position-posture estimation, 3D points of a 3D-shaped model are projected on a captured image plane and the 3D points projected on an image coordinate serve as corresponding points. Here, to simulate the retrieval, a base geometric feature is projected on the observation image plane of the reference position-posture so that a pixel (correspondence point) corresponding to the base geometric feature is obtained. Specifically, the similarity calculation unit 140 renders the 3D-shaped model on the observation image plane of the virtual camera positioned in the reference position-posture in a method similar to the method for detecting the base geometric features performed in step S1300. Here, the similarity calculation unit 140 performs the rendering by assigning IDs the same as those assigned in step S1300 to the surface patches. Next, the similarity calculation unit 140 refers to the pixel (correspondence point) corresponding to a coordinate in which the base geometric feature is detected in the observation image plane subjected to the rendering. Then, the similarity calculation unit 140 determines a color ID of one of the surface patch which includes the pixel as an ID of the correspondence point.

In step S1450, the similarity calculation unit 140 compares the ID of the correspondence point determined in step S1440 with the ID of the base geometric feature recorded in step S1300 so that a degree of similarity is calculated. When the two IDs coincide with each other, the similarity calculation unit 140 determines that an appropriate correspondence is obtained and sets a similarity degree of 1. Thereafter, the process proceeds to step S1460. On the other hand, when the two IDs do not coincide with each other, the similarity calculation unit 140 determines that a failure correspondence is obtained and sets a similarity degree of 0. Thereafter, the process proceeds to step S1470.

Figure 6B:
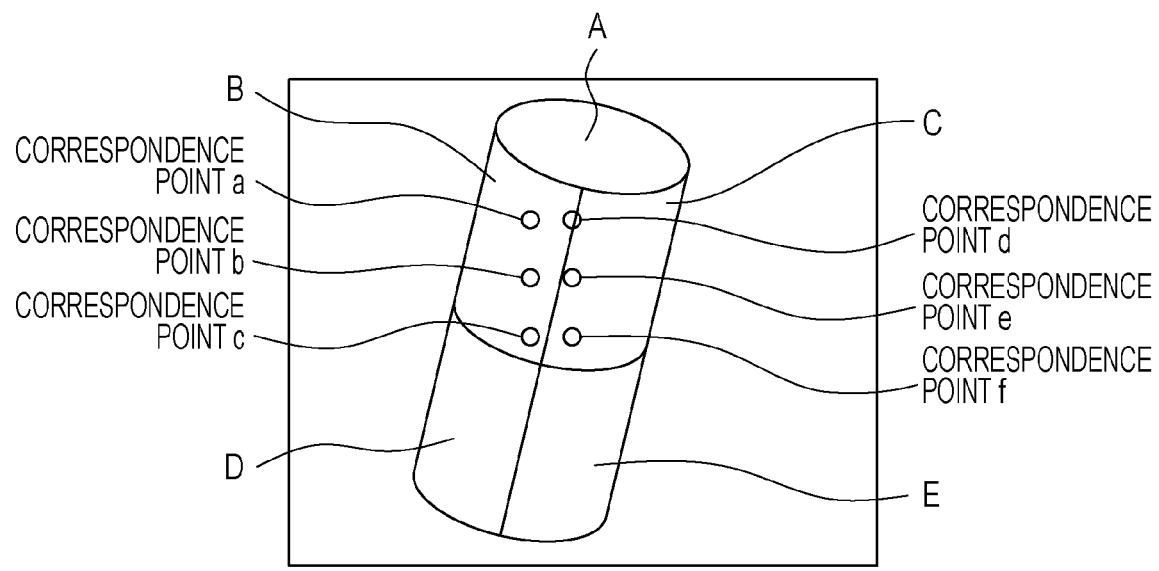

FIG. 6B is a diagram illustrating a state in which the 3D-shaped model is projected on the observation image plane of the virtual camera positioned in the reference position-posture. In step S1300, the ID of the surface patch B is recorded in the base geometric features a to f as shown in FIG. 6A. On the other hand, as shown in FIG. 6B, among pixels (correspondence points) corresponding to the base geometric features on the observation image plane of the virtual camera positioned in the reference position-posture, the ID of the surface patch B is recorded in the correspondence points a, b, c, and d and the ID of the surface patch C is recorded in the correspondence points e and f. In this case, it is determined that the base geometric features a, b, c, and d have appropriate correspondence and similarity degrees thereof are 1 whereas the base geometric features e and f have failure correspondence and similarity degrees thereof are 0.

In step S1460, the similarity calculation unit 140 updates, to Ci+1, the value Ci of the counter which counts the number of times an appropriate correspondence is successfully obtained in the base geometric feature i. In step S1470, the similarity calculation unit 140 determines whether a series of operations from step S1430 to step S1460 has been performed on all the M base geometric features. When the determination is affirmative, the process proceeds to step S1480.

On the other hand, when the determination is negative, the process returns to step S1430 and the same operations are performed on the next base geometric feature.

In step S1480, the similarity calculation unit 140 determines whether a series of operations from step S1420 to step S1470 has been performed on all the reference geometric features. When the determination is affirmative, the process proceeds to step S1490. On the other hand, when the determination is negative, the process returns to step S1420 and the same operations are performed on the next reference position-posture. Specifically, the process from step S1420 to step S1480 is performed a number of times corresponding to the number of reference position-postures, that is, N times.

In step S1490, the evaluation-value calculation unit 150 calculates evaluation values in accordance with the numbers of appropriate correspondences obtained in the N-times attempts performed to obtain correspondences for individual base geometric features detected in step S1300. Specifically, the value of the counter Ci representing the number of appropriate correspondences of the base geometric feature i is set to Ci, and the evaluation-value calculation unit 150 calculates an evaluation value Vi in accordance with Expression 1 below.

$$Vi = Ci/N \tag{1}$$

In step S1500, the position-posture-calculation model generation unit 160 makes combinations of the M base geometric features detected in step S1300 and the M evaluation values calculated in step S1400.

Then, the position-posture-calculation model generation unit 160 stores the combinations of the M base geometric features and the evaluation values and the corresponding base position-posture as an each-viewpoint position-posture calculation model in the base position-posture.

In step S1600, the model generation device 1 determines whether the process from step S1200 to step S1500 has been performed on all the base position-postures. When the determination is negative, the process returns to step S1200 and the same process is performed on the next base position-posture. On the other hand, when the determination is affirmative, the process is terminated. Consequently, each-viewpoint position-posture calculation models for all the set base position-postures are stored whereby a position-posture calculation model can be obtained.

Figure 4:
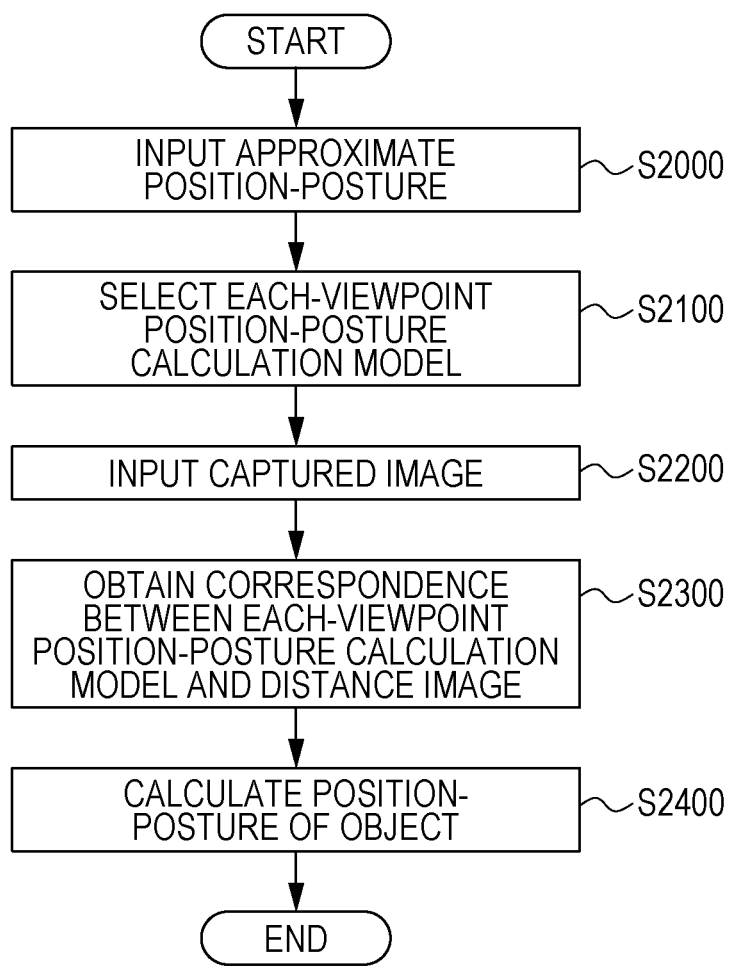
FIG. 4 is a flowchart illustrating a position-and-posture estimation process.

Next, operations in a position-posture estimation process using a position-posture calculation model will be described with reference to FIG. 4. FIG. 4 is a flowchart illustrating a position-posture estimation process. Note that the position-posture estimation process described hereinafter may be performed by an external apparatus which receives a result of the process shown in FIG. 3A.

In step S2000, the position-posture calculation unit 180 inputs an approximate position-posture. In the position-posture calculation unit 180, a 3D coordinate system (base coordinate system) serving as a base of position-posture measurement is prescribed. A position-posture of the object in the position-posture calculation unit 180 represents a position-posture of the object in the base coordinate system. In this embodiment, the center of the camera is determined as an origin and an optical axis of the camera is determined as a z axis in the base coordinate system.

Furthermore, in this embodiment, the position-posture calculation unit 180 consecutively performs measurements in a time axis direction, and a preceding measurement value (at a preceding measurement time) is used as an approximate position-posture. However, the method for inputting the approximate position-posture is not limited to this. For example, a current position-posture may be estimated in accordance with a preceding position-posture and an amount of change of a position-posture estimated in accordance with a result of a measurement of the preceding position-posture. Alternatively, in a case where a position-posture of the object is roughly obtained in advance, a value of the position-posture may be set as the approximate position-posture.

In step S2100, the position-posture calculation unit 180 selects one of each-viewpoint position-posture calculation models in the position-posture calculation model. Specifically, the position-posture calculation unit 180 selects, from among the each-viewpoint position-posture calculation models stored as the position-posture calculation model, an each-viewpoint position-posture calculation model corresponding to a base position-posture which is most similar to the approximate position-posture input in step S2000. To select the most similar base position-posture, the position-posture calculation unit 180 calculates differences $\Delta R$ between the approximate position-posture and the base position-postures, and selects one of the base position-postures corresponding to the smallest difference $\Delta R$.

Alternatively, the position-posture calculation unit 180 may calculate position differences $\Delta T$ or posture differences $\Delta R$ between the approximate position-posture and the base position-postures, rank the position differences $\Delta T$ and the posture differences ΔR of all the base position-postures, and select one of the base position-postures corresponding to the smallest sum of the rank of the position difference ΔT and the rank of the posture difference ΔR.

In step S2200, the image pickup unit 170 captures a distance image which includes information on a depth from the distance sensor and supplies the distance image to the position-posture calculation unit 180. In step S2300, the position-posture calculation unit 180 obtains a correspondence between the each-viewpoint position-posture calculation model input in step S2100 and the distance image supplied in step S2200. Here, the position-posture calculation unit 180 eliminates base geometric features which have low evaluation values in the each-viewpoint position-posture calculation model. Specifically, the position-posture calculation unit 180 sets a threshold value for the evaluation values in advance (threshold value is 0.3, for example), and selects base geometric features having evaluation values $V_i$ larger than the threshold value. In this way, since the base geometric features which are likely to generate failure correspondence are eliminated in advance, adverse effect to the position-posture estimation is reduced. Alternatively, if a high threshold value is set (threshold value is 0.8, for example), only base geometric features which ensure appropriate correspondences may be used. Subsequently, the position-posture calculation unit 180 projects the selected base geometric features on a distance image plane and refers to distance values of pixels positioned nearest to projection positions from the distance image. Then, the position-posture calculation unit 180 multiplies the distance values of the pixels by sight-line vectors corresponding to positions of the pixels so as to obtain coordinates of 3D points. The obtained 3D points serve as model geometric features (correspondence points) in the 3D-shaped model which correspond to the geometric features in the distance image.

In step S2400, the position-posture calculation unit 180 minimizes a sum of distances between the geometric features in the distance image obtained in step S2300 and the correspondence points in the 3D-shaped model by a nonlinear optimization method so as to obtain a position-posture of the object. Specifically, the position-posture calculation unit 180 establishes an observation equation used for calculating a position-posture of the object in accordance with the correspondences between the geometric features in the distance image and the correspondence points in the 3D-shaped model. 3D coordinates (x', y', z') in the 3D points in the base coordinate system are converted into 3D coordinates (x, y, z) in a coordinate system of the 3D-shaped model in accordance with a position-posture s of the object. It is assumed that a certain point in the 3D point data is converted into a coordinate of the object using the approximate position-posture. The coordinates (x, y, z) are changed in accordance with the position-posture of the object and can be approximated to the coordinates (x', y', z') by one-dimensional Taylor expansion as represented by Expression 2.

$$x \approx x' + \sum_{i=1}^{6} \frac{\partial x}{\partial s_i} \Delta s_i \quad (2)$$

$$y \approx y' \sum_{i=1}^{6} \frac{\partial y}{\partial s_i} \Delta s_i$$

$$z \approx z' \sum_{i=1}^{6} \frac{\partial z}{\partial s_i} \Delta s_i$$

The position-posture calculation unit 180 establishes observation equations represented by Equation 2 for all the 3D points which have been subjected to the correspondence operation. Subsequently, the position-posture calculation unit 180 calculates correction values of the position-posture in accordance with Expression 2 and corrects the approximate position-posture. Since Expression 2 is used to obtain minimal changes $\Delta s_i$ (i is one of 1 to 6) of components of the position-posture s, a linear simultaneous equation relative to the minimal changes $\Delta s_i$ can be obtained as represented by Expression 3.

$$\begin{bmatrix} \frac{\partial x}{\partial s_1} & \frac{\partial x}{\partial s_2} & \cdots & \frac{\partial x}{\partial s_6} \\ \frac{\partial x}{\partial s_1} & \frac{\partial x}{\partial s_2} & \cdots & \frac{\partial x}{\partial s_6} \\ \vdots & \vdots & \ddots & \vdots \\ \frac{\partial y}{\partial s_1} & \frac{\partial y}{\partial s_2} & \cdots & \frac{\partial y}{\partial s_6} \\ \frac{\partial y}{\partial s_1} & \frac{\partial y}{\partial s_2} & \cdots & \frac{\partial y}{\partial s_6} \\ \vdots & \vdots & \vdots & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} x_1 - x'_1 \\ x_2 - x'_2 \\ \vdots \\ y_1 - y'_1 \\ y_2 - y'_2 \\ \vdots \end{bmatrix} \quad (3)$$

By calculating the simultaneous equation, the minimal changes $\Delta s_i$ serving as the correction values of the position-posture are obtained. The position-posture calculation unit 180 corrects the approximate position-posture using the correction values $\Delta s_i$ so as to obtain a final position-posture of the object. Here, Expression 3 is represented as Expression 4 below.

$$J\Delta s = E \quad (4)$$

The position-posture calculation unit 180 multiplies values of both sides of Expression 4 by a generalized inverse matrix $(J^T \cdot J)^{-1} \cdot J^T$ of a matrix J so as to obtain a correction value $\Delta s$ for the position-posture and corrects the approximate position-posture.

Note that although the correction of the position-posture is performed only once in the embodiment described hereinabove, the correction of the position-posture may be repeatedly performed by repeatedly performing a correspondence process in accordance with the corrected approximated position-posture.

In the first embodiment described hereinabove, a method for adding the evaluation values of the correspondences to the 3D-shaped model in advance at a time of the model fitting between the distance image and the 3D-shaped model has been described. Specifically, in this embodiment, a margin of error of an initial position-posture which is expected at the time of the model fitting is given, simulation of correspondences is performed a number of times, and rates of correspondences successfully performed are determined as the evaluation values of the base geometric features. In this way, since base geometric features having low evaluation values are not used at the time of the calculation of the position-posture of the object, the probability of generation of failure correspondences is reduced and robust measurement can be performed.

Furthermore, in this method, the number of base geometric features used for the position-posture estimation is reduced. As a result, high-speed calculation is simultaneously realized.

Next, a second embodiment of the present invention will be described. According to the first embodiment, the similarity calculation unit 140 compares the IDs of the surface patches to which the base geometric features belong in the 3D-shaped model with the IDs of the surface patches to which the correspondence points belong in the captured image plane of the reference position-posture in the 3D-shaped model.

Then, determinations as to whether an appropriate correspondence or a failure correspondence is obtained are made in accordance with correspondences between the IDs. On the other hand, in the second embodiment, IDs of surface patches are not used for determinations as to whether an appropriate correspondence or a failure correspondence is obtained, but the determinations as to whether an appropriate correspondence or a failure correspondence are made by calculating degrees of similarity of planes using 3D points of a 3D-shaped model and 3D points of a captured image. Specifically, in the second embodiment, combinations of base geometric features and normal vectors of the base geometric features on 3D-shaped model planes are obtained and the combinations are recorded.

Then, sameness of distances and normal directions between planes which are defined by coordinates of the base geometric features and the normal vectors and planes which have correspondences with the base geometric features in the 3D-shaped model is calculated as degrees of similarity so that appropriate correspondences or failure correspondences are determined.

Figure 7:
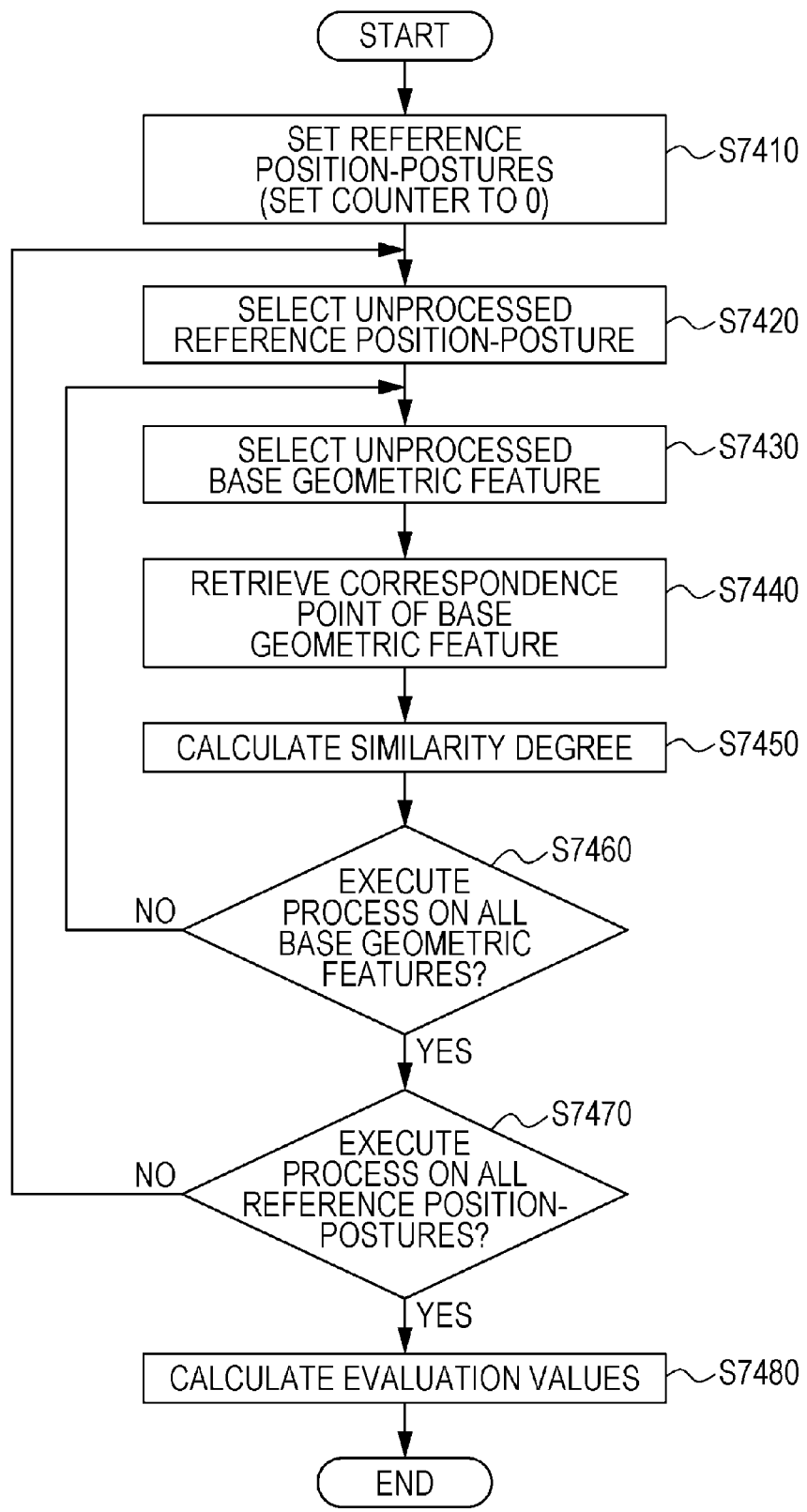
FIG. 7 is a flowchart illustrating an evaluation calculation process shown in FIG. 3A in detail.

A basic configuration of the second embodiment is the same as that shown in FIG. 1, and therefore, a description thereof is omitted. Furthermore, operations performed in the second embodiment are substantially the same as those shown in FIGS. 3A, 3B, and 4. Note that, in the second embodiment, an operation corresponding to the operation in step S1400 shown in FIG. 3A is performed as shown in FIG. 7 in detail.

Here, step S7410 to step S7430, step S7460, and step S7470 are the same as step S1410 to step S1430, step S1470, and step S1480, and therefore, descriptions thereof are omitted. The entire process is different from that of the first embodiment in step S1300, step S7440, step S7450, and step S7480. Hereinafter, the steps different from those of the first embodiment will be described.

First, an operation in step S1300 will be described. In the second embodiment, IDs of surface patches to which 3D points detected as base geometric features belong are not assigned. Instead normal vectors of the base geometric features in the 3D-shaped model are calculated and are recorded along with coordinates of the base geometric features in combination. Specifically, the base geometric features are detected from a depth buffer of an observation image plane in a method similar to that of the first embodiment.

In this case, surface patches are formed by connecting the adjacent base geometric features with each other in the observation image plane, mean vectors of the normal vectors of the surface patches which share the same base geometric features are calculated, and the mean vectors are recorded along with the coordinates of the base geometric features in combination. Alternatively, a number of 3D points are sampled from a 3D-shaped model plane in advance, and when base geometric features are to be detected by projecting the 3D points on the observation image plane, normal vectors are calculated and recorded along with coordinates of the base geometric features.

In step S7440, a similarity calculation unit 140 retrieves a pixel (corresponding point) corresponding to one of base geometric features selected in step S7430 from the observation image plane of a reference position-posture. Specifically, the similarity calculation unit 140 renders the 3D-shaped model on the observation image plane in a method similar to that performed in step S1300 and calculates coordinates of the 3D points in a method similar to that performed in step S1300 in accordance with distance values of pixels calculated with reference to the depth buffer.

The 3D points calculated here serve as reference geometric features. Furthermore, the similarity calculation unit 140 forms surface patches by connecting the adjacent reference geometric features to each other using the obtained reference geometric features, obtains correspondences between the mean vectors of the normal vectors of the surface patches which share the same reference geometric features and the reference geometric features, and records the correspondences. Note that correspondences between the base geometric features and the reference geometric features corresponding to the same 2D coordinates in the observation image plane are obtained.

In step S7450, the similarity calculation unit 140 calculates a degree of similarity of the correspondence between the base geometric feature obtained in step S7440 and a corresponding one of the reference geometric features. Here, a coordinate of the base geometric feature is denoted by "p1" and a normal vector recorded in step S1300 in combination with the coordinate p1 is denoted by "n1".

Furthermore, a coordinate of the reference geometric feature is denoted by "p2" and a normal vector recorded in step S7440 in combination with the coordinate p2 is denoted by "n2". Here, a distance between a plane which is vertical to the normal vector n1 and which includes the point p1 to the point p2 is denoted by "dist" and an angle defined by the normal vectors n1 and n2 is denoted by "θ", and the similarity calculation unit 140 calculates the distance dist and the angle θ as degrees of similarity.

In step S7480, an evaluation-value calculation unit 150 calculates evaluation values of correspondences by integrating degrees of similarity of the base geometric features calculated relative to the reference position-postures. Specifically, the evaluation-value calculation unit 150 normalizes values of distances dist calculated relative to the relationships between the base geometric features and the reference position-postures so that the values of the distances dist are included within a range from 0 to 1 and similarly normalizes angles θ.

Next, the evaluation-value calculation unit 150 calculates evaluation values Vi for base geometric features in accordance with Expression 5 below.

$$Vi = (1 - \Sigma(\text{dist}(j) \cdot \theta(j)))/N \tag{5}$$

Note that values dist(j) and θ(j) are obtained in j-th reference position-posture, and a value Σ(dist(j)·θ(j)) represents a sum of products of the similarity degrees dist and θ in all the reference position-postures. Furthermore, "N" denotes the number of reference position-postures.

Note that a method for calculating evaluation values is not limited to this. For example, an evaluation values may be calculated for each base geometric feature such that, when values dist and θ calculated in each of the reference position-postures satisfy Expressions 6 and 7 below, it is determined that an appropriate correspondence is obtained and a degree of similarity is determined to 1 and otherwise the degree of similarity is determined to 0.

$$\text{dist} < \text{thresh1} \tag{6}$$

$$\theta < \text{thresh2} \tag{7}$$

Note that "thresh1" and "thresh2" denote threshold values and appropriate values are set to the threshold values in advance. Note that any method may be employed as long as degrees of geometric similarity are calculated between the base geometric features and the correspondence reference geometric features.

For example, it may be determined that an appropriate correspondence is obtained when one of Expressions 6 and 7 is satisfied. Alternatively, the determination as to whether an appropriate correspondence is obtained may be made only using one of Expressions 6 and 7.

According to the first embodiment, the determination as to whether appropriate correspondences are obtained is made by comparing the IDs of the surface patches to which the base geometric features belong in the 3D-shaped model with the IDs of the surface patches to which the correspondence points belong in the captured image plane of the reference position-posture in the 3D-shaped model.

Accordingly, the evaluation values of the base geometric features depend on a patch-division method for obtaining surface patches which form the 3D-shaped model.

On the other hand, in the second embodiment, since the determination as to whether appropriate correspondences are obtained is made in accordance with the base geometric features, the coordinates of the reference geometric features, and the normal vectors, the evaluation values can be calculated independently from the division method for obtaining the surface patches which form the 3D-shaped model.

Next, a third embodiment of the present invention will be described. In the first embodiment, as a method for obtaining correspondences in the position-posture estimation process, a method for projecting the base geometric features of the 3D-shaped model on the distance image plane in accordance with the approximate position-postures and obtaining correspondences between the base geometric features and the 3D points converted from the distance values of the pixels corresponding to the projected base geometric features is employed.

Accordingly, also when the evaluation values of the base geometric features are calculated, the correspondence points corresponding to the base geometric features are retrieved from the projected image by simulating correspondences performed at the time of the position-posture estimation process. On the other hand, in the third embodiment, among 3D points obtained from a distance image, correspondences between base geometric features and 3D points positioned nearest to the base geometric features in a 3D-shaped model are obtained in the position-posture estimation process. Accordingly, also in a model generation process, evaluation values are calculated by retrieving correspondence points by retrieving points positioned nearest to the base geometric features.

Note that a basic configuration of the third embodiment is the same as that shown in FIG. 1, and therefore, a description thereof is omitted. Furthermore, operations in the third embodiment are substantially the same as those shown in FIGS. 3A, 3B, and 4.

Operations in the third embodiment are different from those shown in FIGS. 3A, 3B, and 4 in step S1440, step S1450, and step S2300.

In step S1440, a similarity calculation unit 140 retrieves 3D points from an observation image plane of a reference position-posture. This operation is performed by a method similar to that for detecting the base geometric features from the observation image plane of base position-postures in step S1300 according to the first embodiment. In this embodiment, the 3D points detected in step S1440 are determined as reference geometric features. Thereafter, a point, among the reference geometric features, which is positioned spatially nearest to a selected one of base geometric features is retrieved as a correspondence point.

In step S1450, the similarity calculation unit 140 determines whether an ID of a surface patch of the base geometric feature in a 3D-shaped model coincides with an ID of a surface patch of the reference geometric feature in the 3D-shaped model with each other, the base geometric feature corresponding to the reference geometric feature. When the determination is affirmative, the similarity calculation unit 140 determines that an appropriate correspondence is obtained. On the other hand, when the determination is negative, the similarity calculation unit 140 determines that a failure correspondence is obtained. Alternatively, as with the second embodiment, a degree of similarity may be calculated in accordance with coordinates of the base geometric feature and the reference geometric feature and normal vectors of planes including the coordinates.

In step S2300, a position-posture calculation unit 180 determines, among the 3D points obtained from a distance image, points which are positioned nearest to the base geometric features in the 3D-shaped model as correspondence points. Note that, any correspondence method may be employed as long as a method for retrieving correspondence points in a position-posture estimation process is similar to a method for retrieving correspondence points in a process of calculating evaluation values of the base geometric features. For example, as the method for retrieving correspondence points in the position-posture estimation process, a so-called normal shooting method may be employed. In the normal shooting method, retrieval is performed in normal directions relative to 3D-shaped model planes including 3D points of a 3D-shaped model arranged in an approximate position-posture. In this case, when a model is to be generated, evaluation values are calculated by correspondence retrieval employing the normal shooting method.

The model generation which is suitable for the correspondence method is basically performed in a method similar to that of the first embodiment, but the following steps are modified. Specifically, in step S1440, the similarity calculation unit 140 obtains the 3D points of the distance image from the observation image plane of the 3D-shaped model of the reference position-posture by a method similar to that performed in step S7440 according to the second embodiment. The similarity calculation unit 140 generates surface patches of the distance image by connecting the adjacent 3D points corresponding to pixels in the distance image with one another. Next, the similarity calculation unit 140 retrieves intersections between lines extending from the points of the base geometric features in normal directions and the plane patches of the distance image. As a result, correspondences between combinations of 3D coordinates of the base geometric features and normal lines and combinations of coordinates of the surface patches of the distance image and normal lines are obtained. In step S1450, the similarity calculation unit 140 determines whether an appropriate correspondence is obtained in accordance with the obtained correspondences between the coordinates and the normal lines in a method similar to that of the second embodiment.

Furthermore, position-posture estimation using the 3D-shaped model is also basically performed in a method the same as that of the first embodiment, but the following steps are modified. Specifically, the position-posture calculation unit 180 forms surface patches by connecting measurement points of adjacent pixels of a distance image input in step S2200. Then, in step S2400, the position-posture calculation unit 180 performs retrieval in normal directions relative to the 3D points in the 3D-shaped model and obtains correspondences between the 3D points and intersections of a mesh formed from the distance image. Succeeding processes are performed in a method similar to that of the first embodiment.

Note that any correspondence method may be employed as long as retrieval of a correspondence point at a time of model generation is performed in a method similar to the correspondence retrieval method at the time of position-posture estimation.

Next, a fourth embodiment will be described. According to the first embodiment, when evaluation values of some of the base geometric features are smaller than the threshold value, the base geometric features are not used since it is highly possible that the base geometric features have inappropriate correspondences. On the other hand, in the fourth embodiment, evaluation values are not used to select base geometric features to be used but the evaluation values are used to set degrees of contribution to position-posture calculation. In this case, the selection of the base geometric features using the threshold value in step S2300 is not performed. Instead, in step S2400, high contribution degrees are set to base geometric features having large evaluation values whereas low contribution degrees are set to base geometric features having small evaluation values in accordance with evaluation values of the base geometric features. Accordingly, the contribution degrees of the base geometric features which are highly likely to have appropriate correspondences are set high. Specifically, a weight to a base geometric feature i is denoted by "Vi" and a weighting matrix W is defined as Expression 8.

$$W = \begin{bmatrix} V1 & & & 0 \\ & V2 & & \\ & & \ddots & \\ 0 & & & Vn \end{bmatrix} \quad (8)$$

The weighting matrix W is a square matrix including 0 in all elements other than diagonal elements, and evaluation values Vi of the base geometric features in a selected viewpoint are assigned to the diagonal elements. Note that any weighting function may be employed as long as large weights are applied to the base geometric features having the large evaluation values and small weights are applied to the base geometric features having the small evaluation values. Using the weighting matrix W, Expression 4 is changed to Expression 9.

$$WJ\Delta s = WE \quad (9)$$

When Expression 9 is solved as represented by Expression 10, a correction value $\Delta s$ is obtained.

$$\Delta s = J^T W J)^{-1} J^T W E \quad (10)$$

Note that the selection of the base geometric features may be performed in accordance with the evaluation values in a method similar to that of the first embodiment and thereafter weighting may be performed on the selected base geometric features in accordance with the evaluation values.

Next, a fifth embodiment of the present invention will be described. In the first embodiment, the method for performing the position-posture estimation process using the position-posture calculation model generated to be used for fitting with the distance image is described. On the other hand, in the fifth embodiment, generation of a position-posture calculation model used for fitting with a 2D image and position-posture estimation using the generated position-posture calculation model will be described.

Note that a base position-posture setting unit 110, a reference-position-posture setting unit 130, and an evaluation-value calculation unit 150 in the fifth embodiment are the same as those of the first embodiment, and therefore, descriptions thereof are omitted.

A 3D-shaped-model input unit 100 of this embodiment inputs a model representing a shape of an object. In this embodiment, as the 3D-shaped model, a polygon model including surface patches represented by triangle polygons is input.

A detection unit 120 detects base geometric features from an image obtained by observing the 3D-shaped model in a base position-posture. In this embodiment, edges (boundary lines) detected from a 2D image as a contour of the object are used in the position-posture estimation as base geometric features. Specifically, the detection unit 120 detects, among edges of the surface patches which form the 3D-shaped model, the edges serving as the contour in an observation image obtained when the 3D-shaped model is observed in the base position-posture. Here, the detection unit 120 divides a line of the edges in a 3D space such that the line of the edges is divided at a regular interval in an observation image plane. In this embodiment, division points are determined as control points and combinations of 3D coordinates of the control points and 3D vectors representing directions of the edges are determined as base geometric features.

A similarity calculation unit 140 retrieves the edges corresponding to the base geometric features detected by the detection unit 120 from observation image planes of reference position-postures and calculates degrees of similarity with the base geometric features.

The evaluation-value calculation unit 150 calculates evaluation values representing degrees of success of correspondences of the individual base geometric features in accordance with the degrees of similarity calculated by the similarity calculation unit 140. The evaluation values are calculated as rates of a number of reference position-postures in which similarity correspondences are obtained to a number of set reference position-postures.

A position-posture-calculation model generation unit 160 obtains correspondences between the base geometric features and the respective evaluation values calculated by the evaluation-value calculation unit 150 as combinations and also records the combinations and corresponding base position-postures so that each-viewpoint position-posture calculation models are generated.

A image pickup unit 170 captures a 2D image of the object. A position-posture calculation unit 180 calculates a position-posture of the object using a position-posture calculation model generated by the position-posture-calculation model generation unit 160. Specifically, the position-posture calculation unit 180 measures the position-posture of the object by assigning the edges of the position-posture calculation model to edges in the 2D image input by the image pickup unit 170.

Subsequently, operations will be described. In this embodiment, basic operations are the same as those shown in FIGS. 3A, 3B, and 4. Specifically, operations in step S1000 to step S1200, step S1410 to step S1430, step S1460 to step S1490, step S1500, and step S2000 are the same as those of the first embodiment, and therefore, descriptions thereof are omitted.

In step S1300, the detection unit 120 arranges a 3D-shaped model in a base position-posture and detects base geometric features. As described above, in this embodiment, edges of the 3D-shaped model observed as the contour in the observation image plane are detected. Therefore, the detection unit 120 extracts, among edges of polygons included in the 3D-shaped model, lines which serve boundaries of observation when viewed from a sight-line direction using the observation image plane as a boundary plane, as an occluding contour. It is assumed that the line E is an edge shared by polygons A and B in the 3D-shaped model. In this case, when a normal vector of the polygon A is denoted by "n1", a normal vector of the polygon B is denoted by "n2", and a sight-line vector directing to the center of the observation image plane is denoted by "e" using a coordinate system of a virtual camera as a reference, the detection unit 120 detects the line E which satisfies the relationship represented by Expression 11 below as an occluding contour.

$$(n1 \cdot e)(n2 \cdot e) < 0 \tag{11}$$

Note that "n1·e" denotes an inner product of the vector n1 and the vector e and "n2·e" denotes an inner product of the vector n2 and the vector e. Note that all the normal lines of the 3D-shaped model extend from an object inner region to an object outer region.

After extracting the edge which satisfies the relationship from the 3D-shaped model, the detection unit 120 divides the edge in the 3D space and sets points obtained through the division as control points. Here, the detection unit 120 sets the control points such that the edges are divided in a regular interval in the observation image plane (for example, each length has four pixels in the image) when the 3D-shaped model is observed in the base position-posture. Combinations of 3D coordinates of the control points and a 3D vector representing a direction of the edge are determined as base geometric features.

In step S1440, a similarity calculation unit 140 retrieves a geometric feature (reference geometric feature) corresponding to one of the base geometric features from the observation image plane of a reference position-posture. In retrieval of a correspondence point in on-line position-posture estimation, a 3D-shaped model is projected on a captured image plane and brightness gradient is detected within a certain range in a vertical direction relative to an edge direction from coordinates of the projected image whereby an edge is retrieved. Here, to simulate this operation, the similarity calculation unit 140 projects the base geometric features on the observation image plane and obtains reference geometric features corresponding to the base geometric features.

First, the similarity calculation unit 140 arranges the 3D-shaped model in a reference position-posture and detects reference geometric features in a method similar to that performed in step S1300. Note that, although the similarity calculation unit 140 divides the projected edge such that the edge is divided into portions each of which has four pixels in the observation image plane in step S1300, the edge is divided into portions each of which has a pixel in the observation image plane in this step whereby reference geometric features are detected.

Next, the similarity calculation unit 140 projects a base geometric feature (a coordinate of a control point and a 3D vector representing an edge direction) on the observation image plane in which the reference geometric features are detected and obtains a 2D coordinate of the base geometric feature and a 2D vector representing an edge direction. When the edge is projected on the observation image plane, a camera parameter suitable for a camera used in the on-line position-posture calculation is preferably obtained and used. Furthermore, the similarity calculation unit 140 projects a 3D coordinates of a control point of a reference geometric feature on the observation image plane and obtains a 2D coordinate of the reference geometric feature. Here, the similarity calculation unit 140 performs retrieval in a certain range (50 pixels, for example) in a direction vertical to the 2D vector in the 2D coordinate of the base geometric feature and determines whether the projected reference geometric feature is included in the range. Note that, when a plurality of reference geometric features are included in the certain range, one of the reference geometric features which has a control point positioned nearest to the control point of the base geometric feature is determined as a reference geometric feature.

Furthermore, the similarity calculation unit 140 determines whether the base geometric feature and the reference geometric feature which correspond to each other are located on the same contour line and determines whether angles defined the two geometric features are similar to each other so as to calculate a degree of similarity of the two geometric features. Here, the 3D coordinate of the control point of the base geometric feature is denoted by "posA", the 3D vector representing the direction is denoted by "dirA", the 3D coordinate of the control point of the corresponding reference geometric feature is denoted by "posB", and the 3D vector representing the direction is represented by "dirB". In this case, when the relationships represented by Expressions 12 and 13 are satisfied, the similarity calculation unit 140 determines that the correspondence between the base geometric feature and the reference geometric feature is an appropriate correspondence and sets a degree of similarity of 1 and otherwise the similarity calculation unit 140 determines that the correspondence between the base geometric feature and the reference geometric feature is a failure correspondence and sets a degree of similarity of 0.

$$\|\text{normal}(posB - posA) \cdot dirA\| > thresh3 \tag{12}$$

$$\|dirA \cdot dirB\| > thresh4 \tag{13}$$

Here, "normal(x)" represents a normal vector of a vector x, a dot (·) represents an inner product, and "$\|x\|$" represents an absolute value of x. Furthermore, "(posB−posA)" represents a value obtained by normalizing a length of a vector which extends from a coordinate A to coordinate B to 1. Note that "thresh3" and "thresh4" represents threshold values and values which are approximately 1 are set to the threshold values, for example. Note that any similarity calculation method may be employed as long as the degree of similarity of the correspondence of the edges can be geometrically obtained. For example, the determination may be made in accordance with the degrees of similarity in Expression 12 or Expression 13.

In step S1500, a position-posture-calculation model generation unit 160 obtains correspondences between base geometric features detected in step S1300 and evaluation values calculated in step S1400.

Furthermore, the position-posture-calculation model generation unit 160 stores the correspondences along with a base position-posture selected in step S1200 and obtains an each-viewpoint position-posture calculation model in the base position-posture. By repeatedly performing the process above on all the base position-postures, each-viewpoint position-posture calculation models of all the base position-postures are obtained as position-posture calculation models.

The process from step S1000 to step S1600 described above corresponds to a model generation process. Subsequently, a position-posture estimation process utilizing a position-posture calculation model will be described.

In step S2100, a position-posture calculation unit 180 inputs a position-posture calculation model generated through the model generation process. In step S2200, the position-posture calculation unit 180 inputs a 2D image captured by the image pickup unit 170.

In step S2300, the position-posture calculation unit 180 obtains a correspondence between the position-posture calculation model supplied in step S2100 and an edge observed in the 2D image input in step S2200. Therefore, the position-posture calculation unit 180 selects, from among the position-posture calculation models, an each-viewpoint position-posture calculation model including base geometric features having evaluation values larger than a threshold value. Thereafter, the position-posture calculation unit 180 projects the selected each-viewpoint position-posture calculation model on the observation image plane and obtains a 2D coordinate and a 2D vector. Subsequently, the position-posture calculation unit 180 detects an extreme value of concentration gradient within a certain range in a normal direction of the 2D vector from the obtained 2D coordinate to thereby detect a coordinate of a corresponding edge in the 2D image. Note that since the edge is detected as the extreme value of the concentration gradient of pixel values, a plurality of edges may be detected in the vicinity of the detected edge. In this embodiment, among the detected edges, an edge located nearest to the projected control point is determined as a corresponding edge.

In step S2400, the position-posture calculation unit 180 establishes an observation equation used to calculate a position-posture of an object in accordance with a correspondence between the position-posture calculation model obtained in step S2300 and the 2D image and corrects the position-posture of the object. To perform this operation, a method proposed by Vacchetti et al. (L. Vacchetti, V. Lepetit, and P. Fua, "Combining edge and texture information for real-time accurate 3D camera tracking", Proc. 3rd IEEE/ACM International Symposium on Mixed and Augmented Reality (ISMAR '04), pp. 48-57, 2004) is utilized. Note that, instead of use of the selected base geometric features, all the base geometric features may be used and contribution degrees at a time of position-posture calculation may be weighted in accordance with evaluation values. Alternatively, after the base geometric features are selected, weighting may be performed in accordance with the evaluation values.

As described above, in the fifth embodiment, the evaluation values obtained by simulating accuracy of the correspondences are added to the 3D-shaped model in advance in model fitting with the 2D image. Then, base geometric features which are highly likely to obtain appropriate correspondences in accordance with the evaluation values are selected so that the position-posture of the object is calculated. In this way, robust measurement can be performed while influence of failure correspondences is reduced.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-279516, filed Dec. 15, 2010, which is hereby incorporated by reference herein in its entirety.

The invention claimed is:

1. An information processing apparatus comprising:
a first setting unit configured to set a relative position-and-posture relationship between a three-dimensional-shaped model of an object and a viewpoint from which the three-dimensional-shaped model is observed as a base position-posture;
a detection unit configured to detect geometric features of the three-dimensional-shaped model observed from the viewpoint in the base position-posture as base geometric features;
a second setting unit configured to set a relative position-and-posture relationship between the three-dimensional-shaped model of the object and a viewpoint from which the three-dimensional-shaped model is observed as a reference position-posture which is different from the base position-posture;
a retrieval unit configured to retrieve reference geometric features corresponding to the base geometric features of the three-dimensional-shaped model observed from the viewpoint in the reference position posture;
a first calculation unit configured to calculate a degree of similarity between the base geometric features and the reference geometric features; and
a second calculation unit configured to calculate evaluation values of correspondences between the base geometric features and the reference geometric features based on the degree of similarity.

2. The information processing apparatus according to claim 1, further comprising:
a third calculation unit configured to calculate a position and a posture of the object by fitting the base geometric features selected in accordance with the evaluation values to geometric features in data of an image of the object captured by an image pickup unit.

3. The information processing apparatus according to claim 1,
wherein the second setting unit sets a plurality of reference position-posture, the first calculation unit calculates degrees of similarity between the base geometric features and the reference geometric features for individual reference position-posture, the second calculation unit calculates evaluation values of correspondences between the base geometric features and the reference geometric features for individual base geometric features in accordance with the degrees of similarity calculated by the first calculation unit.

4. The information processing apparatus according to claim 3, wherein the second calculation unit calculates rates of the number of appropriate correspondences between the base geometric features and the reference geometric features to the number of reference position-posture in accordance with the degrees of similarity calculated by the first calculation unit as the evaluation values.

5. The information processing apparatus according to claim 1,
wherein the base geometric features are points on the three-dimensional-shaped model or points having directions on the three-dimensional-shaped model.

6. The information processing apparatus according to claim 1,
wherein the first calculation unit calculates degrees of similarity between the base geometric features and the reference geometric features in accordance with sameness of surface patches of the three-dimensional-shaped model to which the base geometric features belong and surface patches of the three-dimensional-shaped model to which the reference geometric features belong.

7. The information processing apparatus according to claim 1,
wherein the first calculation unit calculates degrees of similarity between the base geometric features and the reference geometric features in accordance with sameness of positions and directions of the base geometric features on the three-dimensional-shaped model and positions and directions of the reference geometric features on the three-dimensional-shaped model.

8. The information processing apparatus according to claim 2, wherein the third calculation unit selects the base geometric features having the evaluation values equal to or larger than a predetermined value and calculates a position and a posture of the object by fitting the selected base geometric features to geometric features in the data of the image of the object.

9. The information processing apparatus according to claim 2,
wherein the third calculation unit sets weights corresponding to the evaluation values to the base geometric features and calculates a position and a posture of the object by fitting the base geometric features to which the weights are added to geometric features in the data of the image of the object.

10. An information processing method comprising:
a first setting step of setting a relative position-and-posture relationship between a three-dimensional-shaped model of an object and a viewpoint from which the three-dimensional-shaped model is observed as a base position-posture;
a detection step of detecting geometric features of the three-dimensional-shaped model observed from the viewpoint in the base position-posture as base geometric features;
a second setting step of setting a relative position-and-posture relationship between the three-dimensional-shaped model of the object and a viewpoint from which the three-dimensional-shaped model is observed as a reference position-posture which is different from the base position-posture;
a retrieval step of retrieving reference geometric features corresponding to the base geometric features of the three-dimensional-shaped model observed from the viewpoint in the reference position-posture;
a first calculating step of calculating a degree of similarity between the base geometric features and the reference geometric features; and
a second calculation step of calculating evaluation values of correspondences between the base geometric features and the reference geometric features based on the degree of similarity.

11. A computer readable recording non-transitory medium which stores a program which causes a computer to execute:
a first setting step of setting a relative position-and-posture relationship between a three-dimensional-shaped model of an object and a viewpoint from which the three-dimensional-shaped model is observed as a base position-posture;
a detection step of detecting geometric features of the three-dimensional-shaped model observed from the viewpoint in the base position-posture as base geometric features;
a second setting step of setting a relative position-and-posture relationship between the three-dimensional-shaped model of the object and a viewpoint from which the three-dimensional-shaped model is observed as a reference position-posture which is different from the base position-posture;
a retrieval step of retrieving reference geometric features corresponding to the base geometric features of the three-dimensional-shaped model observed from the viewpoint in the reference position posture;
a first calculating step of calculating a degree of similarity between the base geometric features and the reference geometric features; and
a second calculation step of calculating evaluation values of correspondences between the base geometric features and the reference geometric features based on the degree of similarity.

\* \* \* \* \*